United States Patent [19]
Kaieda

[11] Patent Number: 5,972,274
[45] Date of Patent: Oct. 26, 1999

[54] MAKING OF CERAMIC TUBE

[75] Inventor: Yoshinari Kaieda, Ibaraki, Japan

[73] Assignee: National Research Institute for Metals, Ibaraki, Japan

[21] Appl. No.: 09/010,791

[22] Filed: Jan. 22, 1998

[51] Int. Cl.⁶ .................................................. B28B 21/42
[52] U.S. Cl. .................... 264/404; 264/610; 264/635; 264/646; 264/647; 264/81
[58] Field of Search .................... 264/404, 610, 264/635, 646, 647, 81

[56] References Cited

U.S. PATENT DOCUMENTS

| | | | |
|---|---|---|---|
| 3,576,932 | 4/1971 | Biddulph | 264/635 |
| 4,591,470 | 5/1986 | Goto | 264/635 |
| 4,986,945 | 1/1991 | LaRoche | 264/610 |
| 5,672,302 | 9/1997 | Chatterjee et al. | 264/647 |

FOREIGN PATENT DOCUMENTS 49-000322  1/1974  Japan ..................................... 264/610

*Primary Examiner*—James Derrington
*Attorney, Agent, or Firm*—Wenderoth, Lind & Ponack, L.L.P.

[57] ABSTRACT

A conductive wire is electrically heated in a gas atmosphere, wherein a gas reacts with a constituent material of the conductive wire, under gravity-free or micro gravity state. A ceramic is formed on a surface of the wire sa an outer core through a reaction between the wire and the gas and is left by caving an inside wire by melting while maintaining controlled gas convection.

4 Claims, 3 Drawing Sheets

MAKING OF CERAMIC TUBE

FIELD OF THE INVENTION

The present invention relates to making of ceramic tubes. More particularly, the present invention relates to a method of making a ceramic tube, which facilitates making of ceramic tubes having several properties such as heat resistance or corrosion resistance, and contributes to mass production of ceramic tubes.

DESCRIPTION OF THE PRIOR ART

Ceramic tubes have been conventionally made according to a process in which a fine metallic wire as a center core, which is coated with ceramic powders, is pre-sintered in an appropriate gas atmosphere, and the pre-sintered product is sintered after extracting the center metallic core from the pre-sintered product.

This process is particularly suitable to semi production, but not to mass product. Besides, it is difficult to make finer ceramic tubes in the process.

Another process, which is capable of mass production, is known. In this process, ceramic powders kneaded with binders are extruded into a pipe and the pipe is sintered.

Some defects still remain in this process, one of which is that tools of machines used for making tubes are easily abraded because hard ceramic powders are used for the raw materials.

SUMMARY OF THE INVENTION

The present invention has an object to provide a method of making a ceramic tube, which facilitates making of ceramic tubes having several properties such as heat resistance or corrosion resistance, and contributes to mass production of ceramic tubes.

This and other objects, features and advantages of the invention will become more apparent on a reading of the following detailed description and drawings;

BRIEF DESCRIPTION OF THE DRAWINGS

FIGS. 3a, 3b, 3d and 3c are photos of a sectional plane of specimens of comparative experiment, which are also taken by an optical microscope.

DETAILED DESCRIPTION OF THE INVENTION

Figure 1:
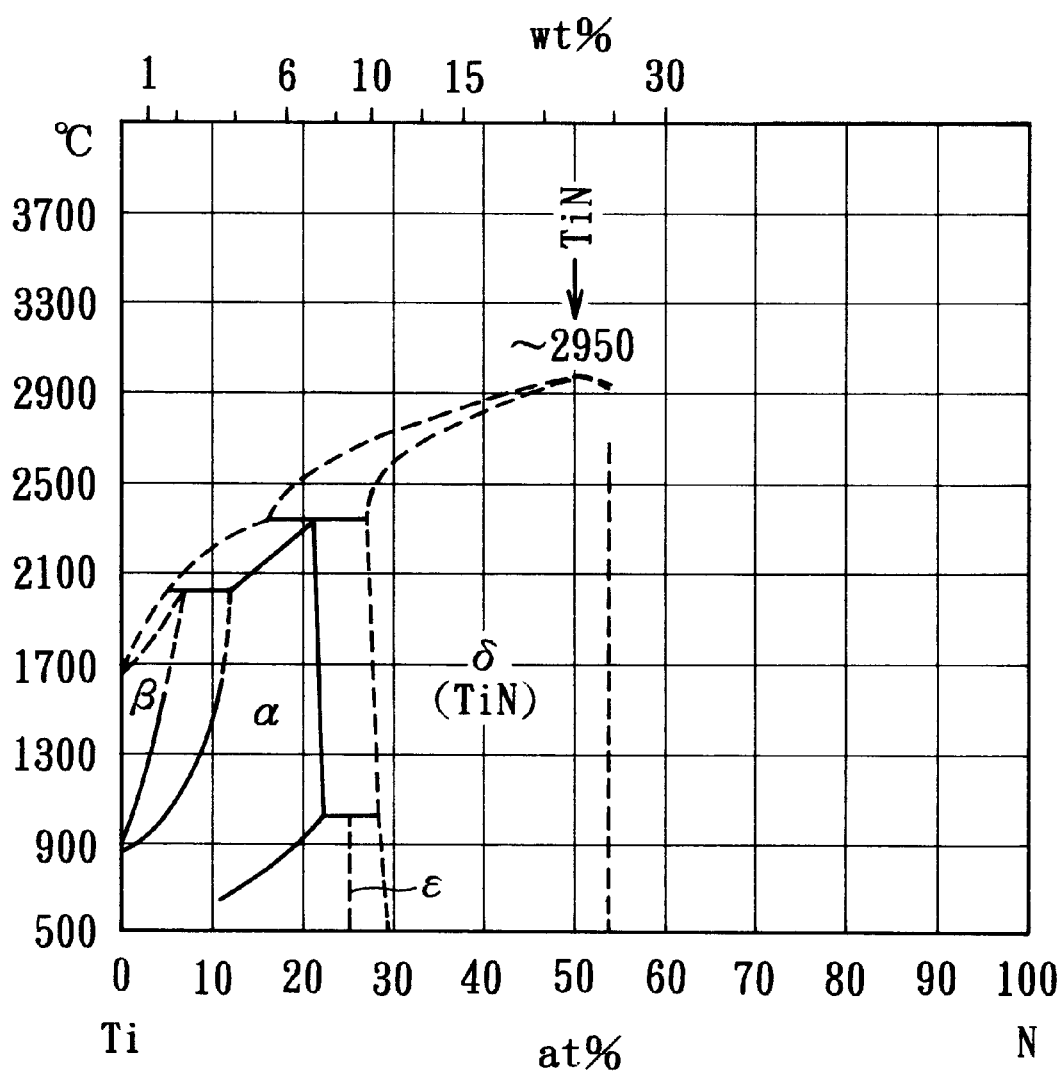
FIG. 1 is a phase diagram of Ti-N.
Figure 2A:
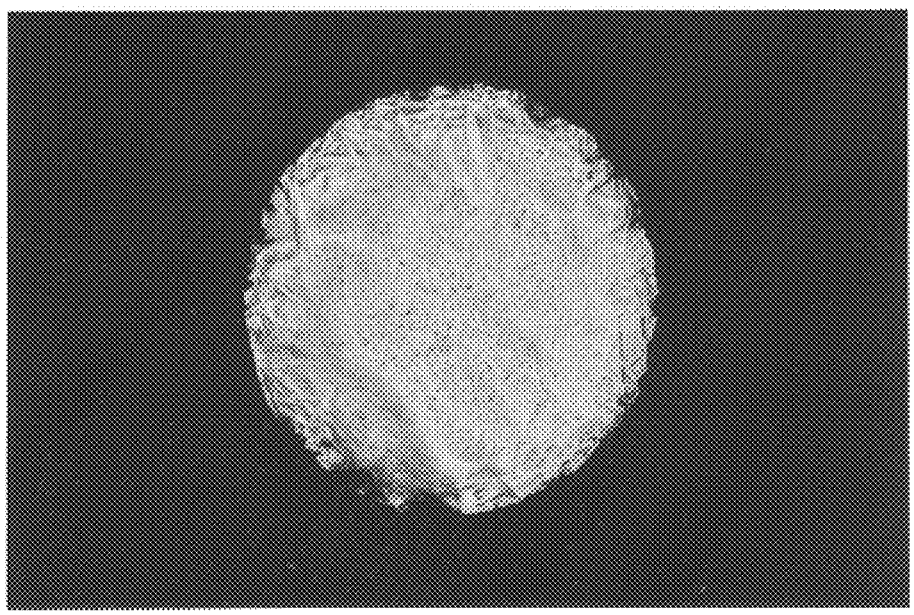
FIGS. 2a, 2b, 2c and 2d are photos of a sectional plane of specimens of example, which are taken by an optical microscope.
Figure 2B:
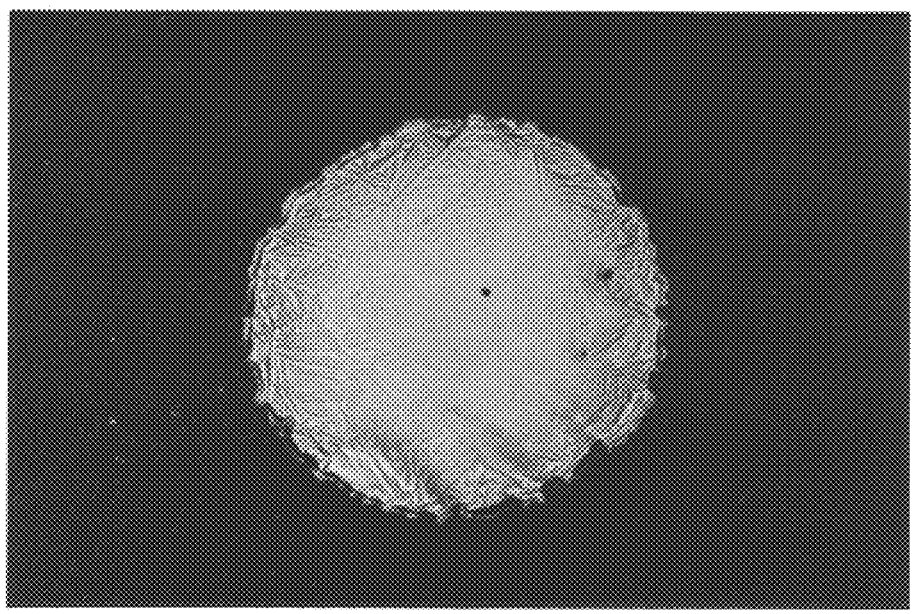
Figure 2C:
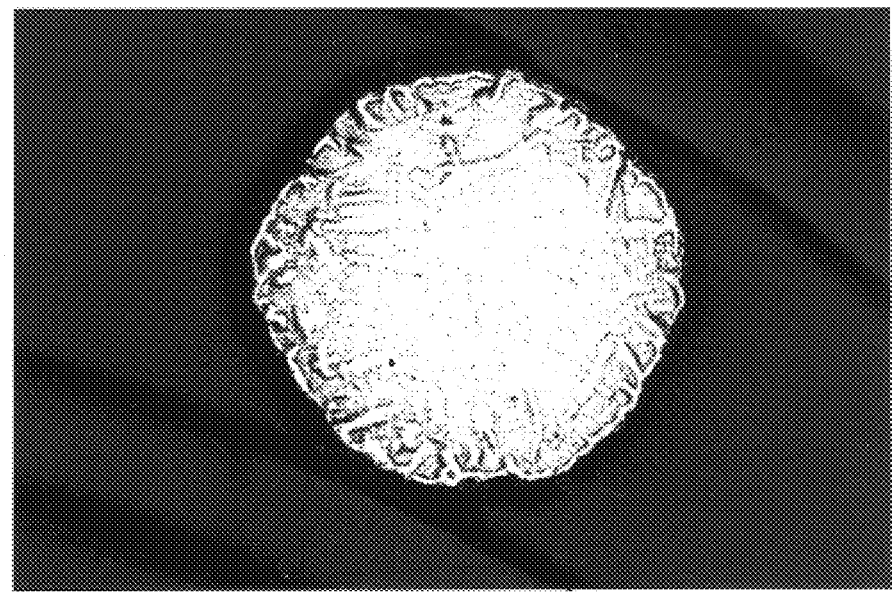
Figure 2D:
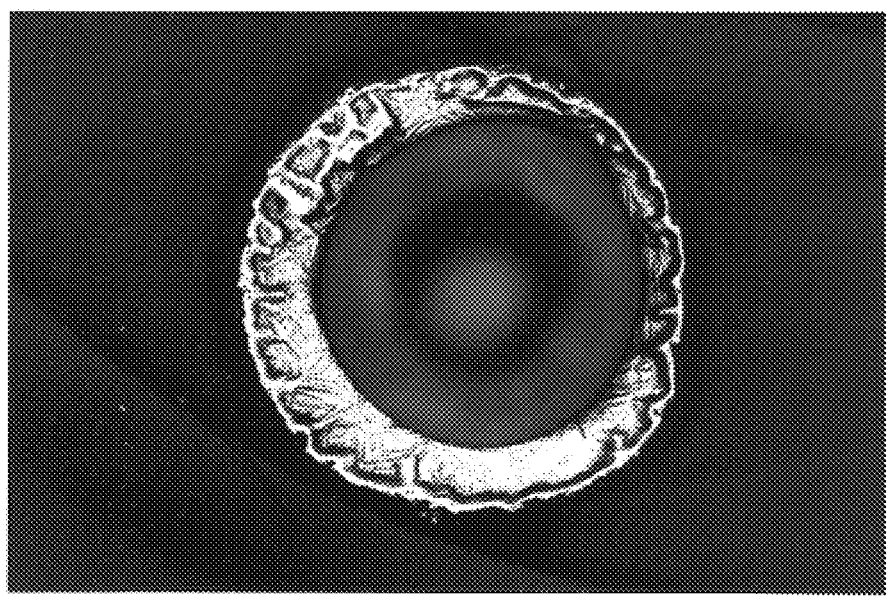

The present invention provides, as a means for solving the problems, a method of making a ceramic tube, comprising the steps of electrically heating a conductive wire in a gas atmosphere, of which a gas reacts with a constituent material of said conductive wire, under gravity-free or micro gravity state, forming a ceramic on a surface of the wire as an outer core through a reaction between the wire and the gas, and leaving the ceramic outer core by caving an inside wire by melting while maintaining controlled gas convection.

The present invention has been accomplished based on the following knowledge, which is acquired during the invention's research to solve above-mentioned problems.

First, a ceramic produced from a starting material, which is capable of synthesizing a ceramics through some reaction, and a gas capable of reacting with the starting material wherein the ceramic produced has higher melting point than the starting material second, convection of an atmospheric gas is controlled in a heating reaction under gravity-free or micro gravity state, and the gas convection does not cool a surface of a wire.

In other words, when a conductive wire made of a material such as a metal including an alloy, which is capable of synthesizing a ceramic through a reaction, is electrically heated in a gas atmosphere, of which a gas reacts with the constituent material, under gravity-free or micro gravity state, a ceramic having higher melting point than the constituent material of the wire has is formed on a surface of the wire through a reaction between the wire surface and the gas.

No convection in an atmospheric gas occurs under gravity-free or micro gravity state even through a conductive wire is electrically heated. The wire is not therefore, cooled by the gas. A reaction does not develop in the inside of the wire because a great amount of the gas is supplied into to the inside of the wire only by the gas convection. As a result, internal temperature of the wire is risen and the inside wire is melted when the internal temperature of the wire is at or higher than the melting point of a constituent material of. A ceramic formed on a surface of the wire is not, on the other hand, melted because it has higher melting point than the wire material. The inside wire is gradually caved and the ceramics is left as an outer core to form a ceramic tube.

A ceramic tube is not, however, made under gravity state of 1G, such as on the ground, even by the process above-mentioned.

When a conductive wire is electrically heated in an atmospheric gas by introducing electric current into the wire, gas convection immediately occurs around the wire and cools the wire from its surface. The wire is heated from its inside by the electrical heating and concurrently cooled by the gas convection.

(1) (Energy of electric heating)<<(Cooling effect by gas convection)

In this case, a conductive wire is heated to some extent, but energy of electric heating is balanced with the cooling effect before a reaction with a gas. A reaction does not take place and the wire is left as it were.

(2) Energy of electric heating is enough to some extent.

In this case, a conductive wire reacts with an atmospheric gas by heating to form a ceramic as a product on a surface of the wire. The temperature of the wire, however, becomes constant by cooling effect of gas convection and hence the reaction does not proceed any more. The wire is stabilized in the state where a surface is made of ceramics, but the inside is the wire itself.

(3) (energy of electric heating)>>(Cooling effect by gas convection)

In this case, a ceramics is formed on a surface of a conductive wire and internal temperature of the wire is risen much higher.

Gas convection is simultaneously prospered. Since a gas is restlessly supplied to the surface of the wire, a reaction develops in the inside wire, resulting into burning down the wire to break it.

In this sense, a ceramic tube whose inside is caved is never made under general gravity state even by the process above-mentioned.

In the present invention, a ceramic tube is made by electrically heating a conductive wire, which is made of a material capable of synthesizing a ceramics through a reaction, in a gas atmosphere, of which a gas reacts with the constituent material, for only several seconds. Making of ceramic tubes will be facilitated and some defects of the prior art will be solved. The process of the present invention will be suitable to mass production because it is easily operated and processing time is very short. In addition, the present invention will contribute to practical use of gravity-free or micro gravity state.

Embodiments

In the present invention, a wire is made of a conductive material, which is capable of synthesizing a ceramics through a reaction and being electrically heated. The conductive material is not restricted to a particular material. Metals including alloys and metalloids, such as silicon, can be used for the conductive material. The shape of a conductive material is not restricted. The sectional shape is, for example, a circular or deformed plane. A circular sectional plane of from a few mm to a few $\mu$m m in diameter is preferable. A ceramic wire deformed is made form a wire with a deformed plane.

An atmospheric gas is a gas which is capable of forming a ceramic on a surface of a wire by reacting with the wire. There is no restriction to the gas. Hydrogen, nitrogen, oxygen, hydrogen sulfide and silane are exemplified.

A ceramics which is formed on a wire surface and left as an outer cone to form a tube is determined by a selection of a wire and a gas. Hydride such as $TiH_2$, $ZrH_2$ or $NbH_2$ will be produced when a hydrogen gas is used. Nitride such as TiN, ZrN, AlN or TaN will be produced from a nitrogen gas. As is similar in these cases, oxide such as $TiO_2$ or $Al_2O_3$ from an oxygen gas, sulfide such as $MoS_2$ or $NbS_2$ from an hydrogen sulfide gas and silicide such as $MoSi_2$, or $ZrSi_2$ from a silane gas will be produced. Another kind of ceramics can also be produced.

For gravity-free or micro gravity state, for example, a field produced in a rocket during ballistic flight, a field produced in an airplane, balloon or falling machine, or a field in an artificial satellite or space airship can be used.

Now, the present invention will be described more in detail by way of examples.

EXAMPLES

A method of making a ceramic tube was performed using a falling machine.

FIG. 1 is a phase diagram of Ti-N. Melting point of TiN is 2,950° C. and is much higher than that of Ti, which is 1,680° C.

Titanium is chosen for a constituent material of a conductive wire and a nitrogen gas for an atmospheric gas.

In a falling machine, gravity is $10^{-5}$ G and is kept for 10 seconds. A pure titanium wire of 0.5 mm in diameter and of 100 mm in length was used for a conductive wire. An atmospheric gas was a nitrogen gas of 0.5 absolute pressure. The wire was heated by introducing electric current of 10% into it. Electric voltage was 12.7V.

The process was repeated four times. Each of introducing time of electric current was 1, 3, 5 and 7 seconds, respectively.

A similar experiment was performed on the ground of 1G for comparison.

FIGS. 3a, 3b, 3c and 3d as well as FIGS. 2a, 2b, 2c and 2d are photos taken by an optical microscope. Images in photos, i.e., FIGS. 2a, 2b, 2c and 2d, are sectional planes of specimens which were made according to the process of the present invention. Images in FIGS. 3a, 3b, 3c and 3d are sectional planes for comparison. Each of a, b, c and d corresponds with 1, 3, 5 and 7 seconds by introducing time of electric current.

In comparing, FIG. 2 with FIG. 3, the following matters will be confirmed.

In micro gravity state, a TiN layer of an outermost layer grows for 5 seconds (FIGS. 2a, 2b and 2c) in the course of heating time and its thickness increases to be about 10 $\mu$m. A particular difference between under micro gravity and gravity state is not confirmed until 3 seconds. At first, Widmanstaetten structure is formed as an internal structure in both cases.

When heating time is 5 seconds (FIG. 2c), dendrite structure is formed under micro gravity state. Compared with FIG. 3c, difference between under micro gravity and gravity state on metallic structure appears to be particular. This is because, under micro gravity state, cooling effect of a nitrogen gas is less since nitrogen gas convection is suppressed, and a reaction develops, accordingly rising the temperature as heating time increases.

At 7 seconds after beginning of the electrical heating, temperature is further risen and a center portion of Ti is melted. The TiN layer is left as an outer cone to form a titanium nitride tube.

On the ground of 1G, a TiN layer of the outermost layer, on the other hand, grows in the course of time and its thickness becomes 10 $\mu$m. Widmanstaetten structure is formed in an internal structure, but this structure gradually disappears as heating time goes by. This is because temperature is constant since heating is balanced with convection cooling. Thus is also because a reaction was decelerated since melting point of the outer most TiN layer is high.

What is claimed is:

1. A method of making a ceramic tube, comprising the steps of electrically heating a conductive wire in a gas atmosphere, wherein the gas reacts with material of said conductive wire, under gravity-free of micro gravity state, forming a ceramic on a surface of the wire as an outer core through a reaction between the wire and the gas, and leaving the ceramic outer core by caving an inside wire by melting while maintaining controlled gas convection.

2. The method of making a ceramic tube as claimed in claim 1, wherein said material of the conductive wire is a metal.

3. The method of making a ceramic tube as claimed in claim 1, wherein heating time is several seconds.

4. The method of making a ceramic tube as claimed in claim 2, wherein heating time is several seconds.

* * * * *